United States Patent [19]

Muncheryan

[11] 3,947,815
[45] Mar. 30, 1976

[54] AUTOMOBILE EMERGENCY-ALERTING SYSTEM

[76] Inventor: Hrand M. Muncheryan, 1735 Morningside St., Orange, Calif. 92667

[22] Filed: May 9, 1975

[21] Appl. No.: 575,948

[52] U.S. Cl. ................................. 340/88; 340/279
[51] Int. Cl.² .................... B60Q 1/00; G08B 21/00
[58] Field of Search ....... 340/75, 81 R, 88, 90, 145, 340/63, 420, 279, 282, 52 F, 87

[56] References Cited
UNITED STATES PATENTS

| | | | |
|---|---|---|---|
| 2,671,212 | 3/1954 | Mingle | 340/88 |
| 2,754,497 | 7/1956 | Wolpert | 340/279 |
| 2,842,628 | 7/1958 | James | 340/279 |
| 2,856,598 | 10/1958 | Bokair | 340/90 |
| 3,469,235 | 9/1969 | Devlin et al. | 340/87 X |
| 3,588,858 | 6/1971 | Demuth | 340/279 X |
| 3,634,885 | 1/1972 | Barkley | 340/279 |
| 3,764,974 | 10/1973 | Melian | 340/52 F |
| 3,800,430 | 4/1974 | Samra | 340/87 X |

*Primary Examiner*—Donald J. Yusko

[57] ABSTRACT

An emergency alarm system for automobiles for signalling passerbys and police that the driver or the occupant of the car needs immediate help due to a sudden attack of illness, heart trouble, stroke, or intrusion by burglars or other criminals is described. The system comprises an alarm and light-flashing device actuated by manually-operated switches located at various readily-accessible parts of the car, or triggered automatically from an alarm-triggering device carried on the shirt pocket of the car driver or occupant. The system also serves to keep the driver awake during a long-distance and tiresome driving trip by intermittently sounding an alarm contained in a driver's cap and connected to the present emergency alerting system, when the driver has the tendency to become drowsy.

20 Claims, 11 Drawing Figures

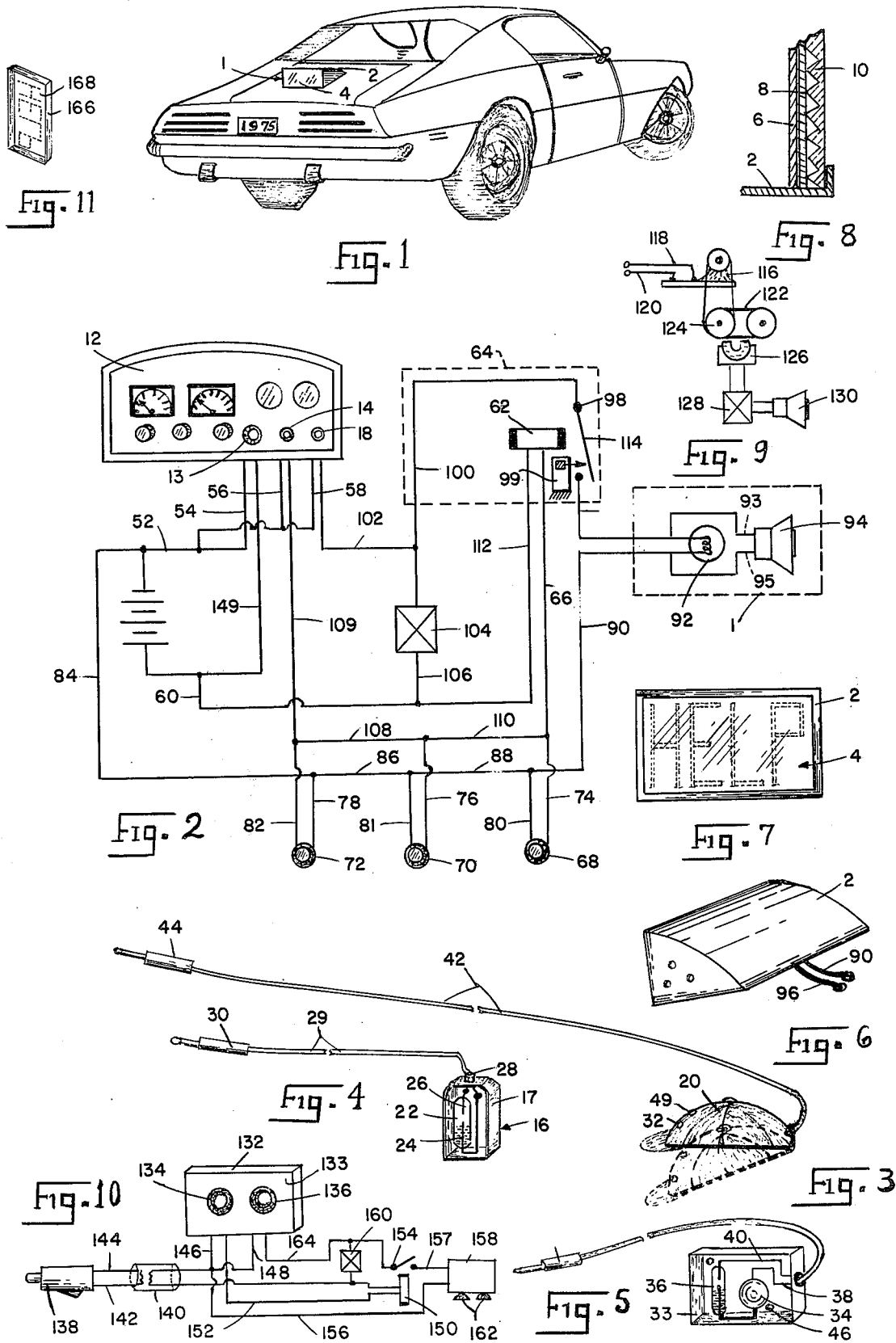

AUTOMOBILE EMERGENCY-ALERTING SYSTEM

The present invention is related to safety and security alarm systems and more particularly it is concerned with a system for alerting from an automobile other people, passerbys, and observers that the driver or an occupant of the car is in trouble arising from failure of his car engine, or he is in danger due to sudden attack of illness, or to some criminal act taking place in the car and the occupant is in need of emergency help from passerbys, police, or the like.

BACKGROUND OF THE INVENTION

Every driver, one time or another, finds himself or herself faced with car trouble, physical illness that prevents him from continuing his travel, assault by criminals, or emergency driving at a faster speed at a zone than the law permits, in order to get his occupant to a hospital. Most of the presently manufactured cars have flashing lights that can be turned on at four corners of the car while the car is parked at one side of the road with the driver waiting for help from others. For emergency driving to a hospital, the driver at times turns on his headlights and blows his car horn and speeds his car to his destination; the procedure may not even be legal in some or most of the States because of the danger of collision with other cars due to speeding.

While these methods may help the driver in alleviating the emergency state, they do not insure his safety and the safety of the other drivers and pedestrians. For instance, when parked on a side of a freeway or a road with his flashing lights on, the driver cannot convey the intent of his parking to other drivers or observers; he may be reading a news item from a newspaper, studying a road map, removing some needed objects from his glove compartment, or possibly needing a mechanic, a policeman, or other help. Since the reason for the driver's parking is not known, almost no one stops to investigate if there is any need for help.

Thus the drivers park on the side of a road for numerous reasons, and one of the most critical reasons is the driver's or the occupant's safety which must be informed to the drivers of the passing cars or police, when help is needed. Certain of the daily car drivers are inflicted with various illnesses, such as heart trouble, fainting spells due to diabetic condition, or a sudden stroke. A parked car may have its occupant undergoing an assault and battery by a criminal; the latter condition may also occur in various city parking lots without the knowledge of the public until the crime has been comitted and the criminal has escaped. These and other incidents are being reported every day in newspapers, on the radio or television.

It should therefore be recognized that continuous flashing of the car lights, if the emergency permits the victim to turn on his lights, while the car is parked on a road, freeway, or parking lot of a supermarket, city library, or ever in a private parking lot, is not a safe measure for obtaining help when essential to the safety of a car driver or a car occupant. Thus, having scrutinized these problems and conditions under which they occur and the ineffectiveness of the mere flashing of the car lights to bring help, the present invention has been devised to eliminate the disadvantages of the present method of flashing light to obtain help. The invention has only a single emergency alerting system which is visible as well as audible for nearly a mile at daytime and somewhat farther at nighttime. The system flashes a bright red light with letters HELP on its display panel together with a high-dB alarm sounds in synchronism with each flash of the red light, thus ensuring that the car driver or the occupant of the car needs help from others outside of the car.

SUMMARY OF THE INVENTION

The present invention is related to my copending application on an Alarm System for Signalling for Emergency Help, Ser. No. 503,446, filed Sept. 5, 1974, which has received final action pending issuance of a Notice of Allowance, the principal difference residing in the present system is its exclusive application and construction for use on passenger cars and trucks. The invention is a security system for alerting other people that the occupant of the car is in need of some type of help, whether it is car trouble or physical danger. It comprises a display unit with a housing adapted to be mounted on the trunk lid of a car or at a suitable location that is easily visible to passerbys from a distance, a flashing light source in said housing, a transparent front panel having the letters HELP die-cut through one layer of the panel, a red and transparent sheet of plastic disposed behind the word HELP and a prismatic lens plate over the word HELP, whereby when the light flashes, the word HELP radiates a red light and at the same time a loud alarm sounds to alert other people. When the system is not operating, the word HELP is invisible because of the total internal reflection of the ambient light due to the prismatic nature of the lens plate, with the prismatic side of the plate facing the red sheet.

The flashing light source, consisting of electric lamps for the display, and the alarm device are energized from the car's battery connected thereto through a plurality of cables terminating in normally open-circuit switches implanted at various accessible points of the car's interior. The system receives energizing current from the cables already connected to the cigaret receptacle of the car, without affecting the cigaret-lighter operation. The system circuit is also provided with receptacles (telephone jacks) built into the instrument panel of the car during manufacture thereof; these jacks are for use with two other car accessories, to be described.

The two accessories referred to are a sleep-preventive cap and an illness-alerting device, each of which plugs into the respective jack especially provided on the instrument panel (dashboard) during manufacture of the car. The sleep-preventive cap contains an alarm means, such as a small buzzer, and a position-sensitive electric switch (mercury switch), which becomes actuated when the driver, wearing the cap and having plugged the cable therefrom into the respective jack on the dashboard, begins to become drowsy while driving. The driver's head tilts forward, closing the mercury switch and thereby energizing the alarm means to arouse the driver. The illness-alerting device is also provided with a position-sensitive switch means contained in a sealed receptacle which is carried, for example, in the shirt pocket of a driver and positioned in an upright position therein. The position-sensitive switch in the upright position is in an electrically open state. A cable extends from the position-sensitive switch means and terminates in a plug which inserts into the respective jack on the dashboard. When the wearer of the device faints or falls to one side due to a sudden illness or stroke, the position-sensitive switch closes, energizing the light display unit with the intermittent alarm in synchronism with the flashing light, the light displaying the word HELP on the display unit during each successive flashing of the light.

To achive these functions, a principal object of the invention is to provide a display unit on an easily noticeable part of a car, said display unit having an illuminable front panel externally visible to other cars or persons nearby.

A further object of the invention is to provide the display unit with a display panel containing the word HELP illuminated from the interior of the display unit by means of one or more electric lamps with a flasher connected in series therewith, and the display panel, a red optical grade plastic sheet interposed between the electric lamp and the plastic front panel plate, thereby radiating a red signal in the form of the word HELP.

Another object of the invention is to provide an alarm device connected in parallel with the electric lamp, said alarm device becoming actuated in synchronism with the flashing word HELP, thereby catching the attention of the passerbys.

A still another object of the invention is to provide a plurality of switches permanently installed in various parts of the interior sides of the car so that any one switch is easily accessible to the occupant from any part of the car during an emergency as described hereinabove.

A further object of the invention is the provision of two separately located jacks in the dashboard of the car, one of which jacks being used for insertion of a plug with a cord extending from an illness-alerting device worn by the driver or the occupant of the car, and the other jack being connected through a plug with a cord to a sleep-preventive cap means worn by the driver during a long-distance driving.

Another object of the invention is to provide a motor-driven acoustic means having a prerecorded magnetic tape or an acoustic memory means to intermittently sound the word HELP at a high dB each time the word HELP is illuminated by the electric lamp in the display panel.

A still other object of the invention is to energize the entire emergency alerting system with its accessory devices from the battery of the car by connection of the system to the wires carrying current to the cigaret-lighter receptacle of the car.

One other object of the invention is to provide such a system as hereinabove described in a self-contained assembly unit for use on cars which are already manufactured without being equipped with said system, by the provision of an alarm and light-display unit attachable by pressuresensitive adhesive to the dashboard of the car and a display unit with suction cups attachable to the body of the car externally thereto, the system having a single plug member for insertion into the cigaret-lighter receptacle to receive current therefrom.

Other objects and advantages of the invention will become apparent from the specification taken in conjunction with the accompanying drawing, in which:

FIG. 1 shows the built-in emergency display unit on a car equipped during manufacture thereof.

FIG. 2 shows the schematic circuit diagram of the entire emergencyalerting system.

FIG. 3 is the sleep-preventive cap means with a cord terminating in a plug which is adapted to be inserted into the respective jack.

FIG. 4 is the position-sensitive switch means for illness-alerting scheme to be employed in the system.

FIG. 5 is the alarm-actuating device (with front panel removed for illustration) for the sleep-preventive cap means.

FIG. 6 is the perspective view of the HELP indicating display unit prior to the installation thereof on a car during manufacture.

FIG. 7 is the front panel view of the display unit.

FIG. 8 is a sectional view of the front panel of the display unit.

FIG. 9 is a schematic view of the acoustic device that sounds HELP in spoken words intermittently with each flash of the electric lamp disposed within the display unit, the acoustic device being a modification of the horn shown in FIG. 2.

FIG. 10 is a self-contained emergency-alerting system attachable to any car already manufactured without being equipped with the present alerting system.

FIG. 11 shows the configuration of the interchangeable front panel.

Referring to the drawing, FIG. 1 shows the emergency-alerting display unit 1 mounted on the trunk lid of a car at a suitable and visible section thereof during manufacture of the car at the factory. The unit has a housing 2 with a display front panel 4, which consists of a red plastic sheet 6, a template 8 with die-cut letters spelling the word HELP therein, and a prismatic plastic sheet 10; the dimensions of the front panel 4 is preferably 4 inches high and 10 inches long typically. The design of the plastic prismatic lens plate 10 is selected so that when the device is not operating the letters HELP are invisible to prevent false indication of an emergency help. Other words, such as EMERGENCY, DISTRESS, DANGER, WARNING, and similar notifying words can be used as emergency-signals in the display panel, if desired. When the system display housing is built into a car at the factory, as shown in FIG. 1, the housing 2 tapers in its posterior section so as to form a triangular side wall; this design eliminates any possible obstruction from the rear view of the driver. The dotted lines indicating HELP on the display panel shown in FIG. 7 are only illustrative and are invisible until the display panel is illuminated by the electric lamp or lamps disposed within the housing 2.

FIG. 2 represents the entire schematic circuit diagram of the system with its attachment points to the car instrument panel 12 and to the sides of the car. Numeral 13 points to the cigaret-lighter receptacle on the dashboard. The instrument panel (dashboard) 12 also contains a jack 14 for connection to the illness-alerting switch mechanism 16 (FIG. 4), and another jack 18 for connection to the sleep-preventive cap means 20, shown in FIG. 3. The illness-alerting switch mechanism 16 is provided with a housing 17 which includes therein a position-sensitive switch (mercury switch) 22 sealed therein in an upright position so that if by any unsuspected manner the glass envelope of the mercury switch 22 breaks no mercury can spill out therefrom, for safety of the user. The front wall of the housing 16 is removed in FIG. 4 to illustrate the position of the mercury switch. The lower electrode 24 is longer than the upper electrode 26 so that when the housing 17 is held upright (normal position) in a vertical plane the mercury contacts the lower electrode 24 only, thus maintaining an open circuit therein. The electrodes 24 and 26 terminate in a normally open push-on push-off pushbutton switch 28 at the upper wall of the housing 17; a double-wire electric cord 29 extends from pushbutton switch 28 to a plug member 30 at the termination of the core 29. During use the plug member 30 is inserted into jack 14. When the wearer of the switch mechanism 16 falls on one side of the car seat, the mercury switch 22 tilts with respect to the vertical plane (of the car), causing the two electrodes 24 and 26 to become electrically connected. This action triggers the emergency-alerting system to operation. Therefore, the switch mechanism 16 operates merely as an automatic switch when the wearer faints and falls to one side due to some illness, or inclines sideways due to a criminal assault thereupon by an intruder. Declination of the switch mechanism 16 at any angle from the vertical plane (of the car) will actuate the mercury switch 22.

The cap member 20 used for the prevention of dozing during driving a car comprises a golfer's cap with holes 32 for circulation of air therethrough, a support member or enclosure 33 which includes an alarm device 34 and a mercury switch 36 connected in series with the alarm device 34. A lead 38 from the alarm device 34 and a lead 40 from the mercury switch 36 connect to a double-wire cord 42 which terminates in an electric plug member 44. The enclosure 33 is attached to the cap member 20 with a bolt and nut attachment through the holes 32 and 46, and 48 and 49. The enclosure 33 may be an arcuate sheet of plastic with the mercury switch 36 and the alarm means 34 attached thereto by means of an adhesive tape or similar attaching means. Attached to the cap member 20 these components are positioned between the cap member 20, at the anterior side thereof, and the plastic enclosure; thus no part of the plastic enclosure is exposed to or touches the head of the wearer, since the front portion of the cap member 20 is usually provided with more cap material than the rear portion, whereby a reasonably large cavity is formed therein to conveniently accommodate the switch-and-alarm assembly therein. The plug member 44 is inserted into the jack 18 during use of the sleep-preventive cap member 20, for connection thereof to the system circuit.

The schematic circuit diagram shown in FIG. 2 comprises a battery 50 (the car battery) one terminal 52 of which is connected to one side of the cigaret-lighter receptacle 13 through lead 54 as well as to one side of jack 14 through lead 56 and to jack 18 through lead 58. The other terminal lead 60 of battery 50 is connected to a solenoid coil 62 of a relay member 64. The other end of solenoid coil 62 connects through lead 66 to the opposite side of jack 14 through sectional leads 110, 108, and 109. Lead 66 also connects to pushbutton switches 68, 70, and 72 through leads 74, 76, and 78, respectively. The pushbutton switches also connect to the battery 50 through sectional leads 80, 81, and 82, respectively, and through the common lead 84. The pushbutton switches 68, 70, and 72 are accessibly located in various sections of the car interior; for example, one switch is adjacent to each of the rear elbow holder and one near the front right elbow holder or rest. Also, a fourth pushbutton (not shown in FIG. 2) may be installed on the driver's side of the elbow rest. In this arrangement, the occupant can reach the nearest switch when an emergency arises.

The lead 84 also extends from the battery 50 through sectional leads 86, 88, and 90 to the electric lamp 92 and alarm means 94 connected in parallel with the lamp 92. The terminal portion 96 of the lead 90 connects to the open side of the relay switch 98, which continues through lead 100 and lead 102 to terminate in jack 18. The lead 100 also branches off and connects to one side of a flasher 104, from which the sectional lead 106 connects to lead 60, terminating in the opposite side of the battery 50, the receptacle 13 being in an open-circuit position. If desired, the horn of the car may be substituted for the horn means 94, by making connections at terminals 93 and 95 after removing the horm 94.

In operation, let it be supposed that an occupant of the car, seated in the rear left side, is in danger of an assault by a criminal, with the driver absent. Let it further be assumed that the pushbutton 72 is the nearest switch to the occupant. Without the knowledge of the criminal, the occupant can press the pushbutton 72, which action immediately sets off the alarm and the flashing light synchronously outside the car, calling for HELP. The sounding of the alarm and the flashing of the light for HELP may result in the forfeiture of the criminal's intention and his escape from the car. Since the relay 64 is a latching relay, the alarm and the flashing of the light for HELP continue until stopped by resetting the relay 64 by button 99 moving in the direction of the arrowhead, FIG. 2. The relay 64 may be selected from a commercial latching relay provided with a reset button thereon or remotely controlled through a cable therefrom. The location of the reset button 99 can be concealed and only known to the driver or his frequent occupant so that the alarm and the flashing light cannot be turned off by an intruder.

The circuit operation in this emergency section proceeds from the normally open pushbutton switch 72, which momentarily closes (by the car victim), permitting a current to flow from battery 50 through lead 84, and sectional leads 78, 82, 108, and 110 to solenoid 62 through lead 66. From the solenoid coil 62, the current is led through leads 112 and 60 to the battery 50, thus completing a full circuit cycle. The flow of current through the solenoid coil 62 produces a magnetic effect on the relay switch blade 114, which closes the relay switch 98. Closing of the relay switch 98 causes a current to flow from battery 50 through lead 84, sectional leads 86, 88, and 90 to electric lamp 92, alarm means 94, lead 96 and through now closed switch 98, lead 100, the flasher 104, sectional lead 106, and the terminal lead 60 back to the opposite side of battery 50, actuating the alarm 94 and the flashing light 92. The relay switch 98 will remain closed indefinitely until it is manually reset to an open position by means of a button 99. The circuit operation will be identical for pushbutton switches 70 and 68, or for any additional switches that may be installed in parallel connection in the other parts of the car, if desired, during manufacture of the car with the present system. It will be seen that the flasher 104 causes the intermittent operation of both the light bulb 92 and alarm means 94 in synchronism.

For a driver who frequently lapses into a coma, stroke, or faints due to a diabetic condition (there bing about 6-million persons with this condition in the United States), the use of the automatic switch mechanism 16 will be very helpful, since time in such emergencies would be the essential factor. Such a driver then may provide himself with a switch mechanism unit 16 by supporting it in his shirt pocket in an upright position in the vertical plane of the car. A cord 29 extending from switch mechanism unit 16 terminates in a plug 30 which is inserted into jack 14 located on the instrument panel 12 of the car. Upon declination of the driver from the vertical plane and falling to one side of the car seat due to a sudden attack of illness, the switch mechanism 16 closes and triggers the alarm-light combination. The switch mechanism 16 is enclosed in a miniature box 17 of a dimension 3/4 inch wide, 3/4 inch deep, and 2 inches in height, and is provided with a fastening means for attachment thereof in an upright position to a suitable region of a wearer's chest, such as shirt pocket. The operation of this device is similar to that of pushbutton switch 72.

For long-distance driving or for driving in a congested freeway wherein the content of carbon monoxide is sufficiently high to cause the driver to feel drowsy, whereby the ordinary conduct of his driving is affected adversely, the cap means 20 is worn by the driver to prevent him from dozing and thereby losing his control of the car. The cap containing the buzzer 34 and the position-sensitive switch 36 is plugged through cable 42 plug 44 into the jack 18 located in the instrument panel 10. In this case, instead of utilizing the display panel unit 1 the device alerts the drowsy driver by means of the position-sensitive switch-buzzer combination (33) in the cap member 20. The current to the buzzer 34 connected in series with the position-sensitive switch 36 is furnished from the car's battery 50 through leads 52 and 58, and when the switch 36 is closed by the forward tilting of the driver's head during a drowsy driving, the current through the switch 36 is fed to the flasher 104 through lead 102 and out therefrom through leads 106 and 60 to the opposite terminal of battery 50, completing the circuit cycle. Thus the alarm in the cap member 20 sounds intermittently due to flasher 104. It should be noted that in actual tests, an intermittent sounding of the alarm has been found more effective than a continuous sounding in arousing the driver from his drowsiness. For this reason, the cap member 20 utilizes the system flasher 104.

In FIG. 9, a system of acoustic loudspeaker is shown, which may be substituted for the alarm horn 94 of FIG. 2. In this system, the low-speed motor 116 is driven by a current from leads 118 and 120 respectively connected to leads 90 and 96. The speed of the motor 116 is synchronized with the repetition rate of the flasher 104 so that every time the flasher 104 is turned on the motor 116 drives the magnetic tape 122 by means of pulley 124 connected thereto. The magnetic tape 122 is prerecorded thereon with the word "HELP" so that every time the tape 122 makes a complete rotation and passes adjacent the magnetic pickup 126 the work HELP is picked up thereby, amplified by amplifier 128, and the amplified acoustic signal is fed to the horn 130, which then sounds at approximately 120 dB loudness so that the sound can be heard at a reasonably long distance or in noisy environment of the speeding cars on the road.

FIG. 10 represents a self-contained emergency-alerting system which is intended for use on cars and trucks which are not equipped with the emergency-alerting system during the manufacture of the vehicle at the factory. This system comprises a boxlike housing 132, of a size 1 1/2 inches wide, about 1 inch deep, and 2 1/2 inches long. The housing 132 contains in its front wall 133 two jacks 134 and 136, into which jacks the position-sensitive switch mechanism 16 and the cap means 20 are inserted, respectively. On the opposite and rear wall of the housing 132 and externally thereto is a pressure-sensitive adhesive tape whereby the housing 132 can be attached to a suitable part of the dashboard of any car which is not factory-equipped with the emergency-alerting system. A plug 138, insertable into the standard cigaret-lighter receptacle of a car, furnishes current to the system from the car's battery, such as the battery 50 shown in FIG. 2, through a cable 140 with leads 142 and 144 included therein. The lead 144 connects to the jacks 134 and 136 through leads 146 and 148, respectively. The lead 142 connects to the coil of a relay solenoid 150 and is led therefrom to jack 134 through lead 152. The lead 146 connects the jack 134 to the opposite terminal of the car battery through lead 144 and plug 138. The leads 142 and 144 respectively correspond to leads 54 and 149 of the circuit diagram shown in FIG. 2.

When it is desired to wear the position-sensitive switch mechanism 16, its plug 30 is inserted into the jack 134. When the position-sensitive switch mechanism 16 is closed, as by an emergency action described for the system shown in FIG. 2, a current flows from the car battery through plug 138 and leads 144 and 146 to jack 134 and through position-sensitive switch mechanism 16 and lead 152 into the coil of relay solenoid 150, from which the current returns to the battery through lead 142 of plug 138. This action of the current magnetizes the relay solenoid 150 and closes the relay switch 154, whereupon a current flows from the battery through lead 144 of plug 138, lead 156 into an emergency-alerting unit 158, lead 157, relay switch 154, flasher 160, and back to the opposite terminal of the battery through lead 142 of plug 138, thus energizing the lamp and the alarm means within the emergency-alerting unit 158, which contains the identical parts and operates identically with the operation of the emergency-alerting unit 1, as shown in FIG. 2. It should be noted herein that the plug 138 which receives its current from any car battery through the car's cigaret-lighter receptacle, the receptacle is already wired to the battery of the car in the factory during manufacture of the vehicle.

The system shown in FIG. 10 principally comprises two units — the housing 132 and the emergency-alerting unit 158, to both of which the plug 138 is connected as shown in the circuit diagram of FIG. 10. However, in order to simplify the assembly into a compact system the flasher 160 is located in the housing 132 and the solenoid relay (150, 154) is disposed in the emergency-alerting unit 158 preferably. All wirings are included in one multiple-lead cable. The cable containing the leads 156 and 157 can be 10 to 12 feet long for convenience of the user (driver). The suction cups 162 located at the bottom section of the emergency-alerting unit 158 attach said unit to any part of the car that is most visible to the passerbys, preferably to the trunk lid of the car, as in the area shown for the display unit 1 presented in FIG. 1.

For long-distance and tiresome driving, the driver may use the cap member 20 shown in FIG. 3. In this case, the driver inserts the plug 44 into the jack 136. When the driver's head tilts due to his getting drowsy the mercury switch 36 tilts and closes the circuit. Then a current passes from the car's battery through plug 138, lead 144, and lead 148 through the alarm means 34 and out through lead 164, flasher 160, and lead 142 back to the opposite terminal of the car battery. The alarm 34 then will sound intermittently at the repetition rate of the flasher 160, to arouse the driver.

When the occupant of the car is subject to frequent fainting during riding the car, he may use the automatic switching mechanism 16 by placing it in the shirt pocket in a verticle position so that the mercury switch 22 is open. The plug 30 is inserted into the jack 134, and when the wearer becomes ill and reclines to one side of the car seat by passing out or by infliction of the illness, the mercury switch tilts togather with the body of the wearer and closes the circuit. This action starts the alarm and the light in the emergency-alerting system 158. The circuit operation is similar to that shown in FIG. 2, as explained for pushbutton switch 72.

The system shown in FIG. 10 may be provided with interchangeable signs in addition to the word HELP as in the system shown in FIG. 2, in which once the display word is selected and installed during manufacture, the word remains permanently in the display unit 1, although changes to the sign may be made by the car user by removing the front panel screws and replacing the template of the panel 4 and reassembling the unit. Other words that can be employed are: STALLED CAR, EMERGENCY, ILL PERSON, CALL POLICE, DANGER, etc. These words can be die-cut in a heavy paper and used in the display panel accessory shown in FIG. 11, wherein a framework 166 holds the die-cut template for the word selected and a red sheet of plastic 168. This framework 166 is inserted around the front panel of emergency-alerting system 158, so that any word desired can be inserted rapidly into the framework 166 and mounted on unit 158, in accordance with the type of emergency situation. For instance, another word that may be used for rushing a lady to the hospital may be MATERNITY CASE, whereby the police observers may understand why the car is moving at a higher speed than the zone in which it is traveling permits.

The disclosure of the invention described herein represents the preferred embodiments of the invention; however, varidations thereof in the form, construction, and arrangement of the various components thereof are possible, such as templates of different word signals can be made on a rolled tape and the selected word sign can be rolled over the display panel 4 in place of inserting different frameworks as shown in FIG. 11, without departing from the spirit and scope of the appended claims. Cap 20 may also be used, without cord 42, by a golf player to stabilize his head at a ball.

I claim:

1. An automobile emergency-alerting system, comprising: an acoustic and visual display means adapted to be mounted on an automobile body readily visible from a distance and operable from the battery of said automobile, said acoustic and visual display means having an electric circuit system connected to the battery of said automobile for receiving energization current therefrom through a continuously-repeating current interrupter disposed in the circuit of said electric circuit system, a plurality of normally-open current-switching means connected theretogether in electrically parallel relations in said electric circuit system, and electric receptacles disposed on the dashboard of said automobile and connected to said electric circuit system in open-circuit relation thereto; said plurality of normally-open current-switching means being disposed in the seating area of said automobile at various readily-accessible points thereof, whereby when any one of said plurality of normally-open current-switching means is actuated to a closed-circuit position during an emergency situation within said automobile, said acoustic and visual display means becomes energized for alerting passerbys, police, and the like that the automobile occupant is in need of immediate help, by repetitive acoustic and visual signalling thereof; a position-sensitive switch means having a housing with said position-sensitive switch means sealed therein, said housing being adapted to be carried in a shirt pocket of the automobile occupant and positioned in said shirt pocket in an upright, vertical plane and in an open-circuit position thereof; said position-sensitive switch means being provided with electric conductors extending from the housing thereof and terminating in a connector means adapted to be inserted into one of said electric receptacles, whereby when said position-sensitive switch means is closed as by tilting thereof, with respect to the vertical plane of said automobile, resultant from the occupant's body declination due to sudden attack of illness thereof, said acoustic and visual display means projects a repeating visual distress signal therefrom and sounds an alarm in synchronism with said repeating distress signal to bring help to the occupant; and, a headwear means, adapted to be worn by the automobile driver, having therein an open-circuit position-sensitive switch means and an alarm means electrically coupled thereto in series relation thereof, said open-circuit position-sensitive switch means having a dual-wire cable with a plug member at the termination thereof for insertion into the other of said plurality of open-circuit electric receptacles, whereby when the wearer's head of said headwear means tilts, due to drowsiness during driving, with respect to the vertical plane of the automobile said position-sensitive switch means tilts therewith and closes the circuit to said alarm means in said headwear, causing a current to flow from said battery through said current interrupter to the alarm means in said headwear means, whereupon a repetitive acoustic signal is produced by said alarm means to arouse the driver.

2. An automobile emergency-alerting system as defined in claim 1, wherein said acoustic and visual display means adapted to be mounted on an automobile body comprises a housing having a transparent window with means representing a distress-word signal and a prismatic-plastic transparent sheet disposed thereon, a source of light disposed in said housing in the posterior relation of said window to illuminate said means representing a distress-word signal for calling for emergency help.

3. An automobile emergency-alerting system as defined in claim 2, wherein said means representing a distress-word signal comprises a die-cut pattern in an opaque sheet in the form of a distress-designating word, said opaque sheet being backed by a red-color plastic sheet material, whereby when said means representing a distress-word signal is illuminated from one side thereof the distress-designating word becomes visible through the transparent prismatic plastic sheet thereon to long distances therefrom.

4. An automobile emergency-alerting system as defined in claim 1, where said electric circuit system connected to the battery of said automobile and operable by said battery comprises a multiple-conductor electric cable from which emerge a plurality of electrical conductors in pairs, a solenoid-type latching relay disposed therein with the coil thereof connected to a pair of said electric conductors, a light source and alarm means having a common housing connect to a pair of said electric conductors, a plurality of current control means disposed in said electric circuit system and connected respectively to a plurality of electric conductors in pairs therein, a flasher means connected in series relation with said light source and said alarm means through a pair of said electric conductors, and three pairs of said electric conductors terminate in open-circuit electric receptacles disposed in the dashboard of said automobile, whereby any one of said current control means when actuated to a closed-circuit position causes the energization of said light source and alarm means therein.

5. An automobile emergency-alerting system as defined in claim 4, wherein the first of said three pairs of electric conductors terminating in open-circuit electric receptacles disposed in the dashboard of said automobile is connected directly to the battery of said automobile, a second pair of electric conductors which terminate at and connect to a second of said open-circuit electric receptacles, said second of said open-circuit electric receptacles being adapted to receive an electric plug member from an electric means for alerting the passerbys with respect to an illness of an occupant in said automobile, and a third pair of electric conductors which terminate at and connect to a third open-circuit electric receptacle which is adapted to receive an electric plug member connected to a cord leading to a drowsiness-preventive device worn by a driver of said automobile during a long-distance travel.

6. An automobile emergency-alerting system as defined in claim 5, wherein said one pair of conductors connected directly to the battery of said automobile are channeled to said battery through the cigaret-lighter receptacle ordinarily equipped on said automobile.

7. An automobile emergency-alerting system as defined in claim 4, wherein said plurality of current control means disposed in said electic circuit system are distributed throughout the automobile interior and located adjacent the front and rear seats of said automobile in readily accessible points thereof and consist of momentary pushbutton switches.

8. An automobile emergency-alerting system as defined in claim 1, wherein said continuously repeating current interrupter is a flasher which becomes connected in series with the acoustic and visual display means upon closing of any one of the normally-open current-switching means and becomes isolated from the circuit of said normally-open current-switching means upon energization of said acoustic and visual display means.

9. An automobile emergency-alerting system as defined in claim 2, wherin said means representing a distress-word signal comprises one of the group of distress-designating words characterized by HELP, DANGER, EMERGENCY, DISTRESS, WARNING, and the like.

10. An automobile emergency-alerting system as defined in claim 1, wherein the acoustic section of said acoustic and visual display means comprises an electronic horn operable directly from the battery of the automobile through a flasher disposed in the electric circuit system thereof.

11. An automobile emergency-alerting system as described in claim 1, wherein said headwear means connected to one of said plurality of open-circuit electric receptacles through a cable means to said electric circuit system thereof comprises a golfer's cap containing therein a carrier means provided thereon a mercury switch normally in open-circuit position when positioned in a vertical plane and becomes closed when tilted with respect to the vertical plane thereof, and a buzzer means connected therein in series relation with said mercury switch, said cable means having dual conductors therein with one conductor thereof connected to said mercury switch and the other conductor thereof to said buzzer means, said conductors terminate in a plug connector to connect said buzzer means to the battery of said automobile for receiving energization current therefrom through the current interrupter disposed in the circuit of said electric circuit system between said battery and the electric circuit of said buzzer to thereby produce a repeating sound signal therein.

12. An automobile emergency-alerting system as defined in claim 1, wherein the acoustic portion of said acoustic and visual display means comprises a loudspeaker, an amplifier connected to said loudspeaker and intermittently moving magnetic tape means with spoken words recorded thereon to produce word signals and to feed said word signals to said amplifier for amplification thereby, and an electric motor for driving said magnetic tape means and connected thereto through pulleys thereof, said motor receiving current from the battery of the automobile through a current interrupter disposed in series relation thereof in a section of said electric circuit system that occurs between said battery and said electric motor to become actuated at the repetition rate of said current interrupter.

13. An automobile emergency-alerting system as defined in claim 1, wherein one of said normally-open current-switching means is closed manually during an emergency situation, a current flows from the battery of the automobile through said current-switching means to the coil of a latching relay means disposed in series connection between said current-switching means and said battery, closing the switch means of said latching relay means, whereupon the current from the battery is diverted by said relay switch means to an acoustic and visual display means connected in series with the relay switch means and with a current interrupter means in the circuit thereof to produce continuously interrupted signals therefrom for an indefinite period until manually stopped by means of a reset switch means disposed in said electric circuit system, said reset switch means being concealed in said automobile in a section thereof unknown to an intruder.

14. An automobile emergency-alerting system as defined in claim 1, wherein said acoustic and visual display means comprises a housing with a window on a side thereof for projecting distress signals therethrough; said window comprising a transparent plastic plate having a detachable framework adapted to be mounted on said window over the transparent plastic plate, said frameword having in the open-section thereof a thin sheet of template die-cut in the form of a distress word therein and a red sheet of plastic permanently attached with said sheet of template to said framework whereby during an emergency situation characteristic of said distress word said framework together with its constituents is mounted over the transparent plastic plate of said window for projecting the distress signal therethrough; said framework having the template and the red plastic sheet is interchangeable with other frameworks of similar dimensions having therein templates die-cut with different distress words, whereby any one of said frameworks with their contents can be attached over the window of said acoustic and visual display means in accordance with the need of the respective emergency situation.

15. An automobile emergency-alerting system as defined in claim 2, wherein said transparent screen disposed in said window comprises a prismatic plastic plate, whereby when the automobile emergency-alerting system is not in operation said means representing a distress-word signal within said window is invisible because of the total reflection and thereby extinction of the ambient light shining externally upon said window, by the individual prisms comprising one surface of said prismatic plastic plate, the prismatic surface thereof being disposed to face inwardly of said window.

16. An automobile emergency-alerting system as defined in claim 1, wherein said system comprises a maze of electrical circuits interlinked theretogether, said maze of electrical circuits having in a section thereof open-circuit electric receptacles mounted in the dashboard of an automobile and connected to an electric flasher, a latching relay means, a plurality of momentary-action pushbutton switches disposed in parallel relation theretogether in said circuit, and means for visual signalling and alarm sounding connected therein in series with said electric flasher; said maze of electrical circuits being connected to the battery of an automobile to receive energization current therefrom; a drowsiness-preventive means with an alarm means and an automatic switch means disposed therein being connected through a cable therefrom to one of said open-circuit electric receptacles mounted in the dashboard of said automobile, whereby when said automatic switch means is closed a current flows from the battery through said one of said open-circuit electric receptacles on said dashboard, said alarm means and automatic switch means in said drowsiness-preventive means, said electric flasher, and back to said battery, whereupon a repeatedly interrupted alarm is produced in said drowsiness-preventive means; and, an illness-alerting means having a housing with a mercury switch disposed therein and positioned in a vertical plane, whereby to maintain an open-circuit condition therein, and electrical coupling means extending from said mercury switch to connect said illness-alerting means to one of the other of said open-circuit electric receptacles disposed on the dashboard of said automobile, whereby when the mercury switch closes during an emergency situation a current flows from said battery through said illness-alerting means, into the coil of said latching relay means back to the battery, closing the switch of said latching relay means and thereby diverting the current from said battery into the acoustic and visual signalling means, through the relay switch, said flasher, and to the opposite side of said battery, thus actuating said acoustic and visual signalling means for emergency help.

17. An automobile emergency-alerting system as defined in claim 1, wherein said system comprises a portable unit of emergency-alerting means adapted with means to be attached to an automobile and operable from the battery thereof, said unit of emergency-alerting means comprises a quadrangular housing provided with first and second electric receptacles disposed in one wall thereof and a pressure-sensitive adhesive material affixed on the opposite wall thereof for attachment of said housing to the dashboard of an automobile by means of said adhesive material thereon; electric conductors extending from each of said electric receptacles for connection to a connector means adapted to be inserted into a cigaret-lighter receptacle of a car equipped therewith for receiving energization current from the car's battery through said cigaret-lighter receptacle, a flasher disposed in the circuit of said unit of emergency-alerting means and connected to both of said electric receptacles, an emergency-alerting means comprising an acoustic means and a light source connected in series relation with said flasher in said unit of emergency-alerting means, and a latching relay means with the energizing coil thereof being connected in the circuit of said unit of emergency-alerting means in series relation with the first of said electric receptacles and the battery of said automobile, whereby when said first of said electric receptacles is electrically closed by an external means inserted thereinto said latching relay means becomes energized, closing the switch means thereof, whereupon a current flows from the battery through said first of said electric receptacles, through said emergency-alerting acoustic and visual means and said flasher means back to the opposite side of the battery, actuating said emergency alerting acoustic and visual means in a repeatedly interrupted mode of action by the repetitive action of said flasher, thereby alerting the passerbys for the need of emergency help.

18. An automobile imergency-alerting system as described in claim 17, wherein said second electric receptacle is adapted to receive a plug means having an electric cord with dual wires therein and extending from said plug means, a cap means, adapted to be worn on a driver's head, having therein an alarm means and a position-sensitive switch means electrically connected thereto in series and coupled to the dual-wire electric cord to receive an energizing current from the battery of said automobile through said second electric receptacle; when said position-sensitive switch means closes as a result of tilting thereof with respect to the vertical plane of said automobile and the tilting of the driver's head therewith due to drowsiness during driving, a current flows from said battery through said second receptacle and said flasher into said alarm means to actuate said alarm means in interrupted intervals due to said flasher action therein, arousing said driver.

19. An automobile emergency-alerting system as defined in claim 1, wherein the housing of said position-sensitive switch means being adapted to be carried in a shirt pocket is provided with push-on push-off push-button switch to control the current through said position-sensitive switch means, whereby the position-sensitive means can be cut off from the battery when said position-sensitive switch means is not in use.

20. An automobile emergency-alerting means as defined in claim 1, wherein said open-circuit position-sensitive switch means and an alarm means electrically coupled thereto and disposed in the headwear means worn by a driver is provided with a carrier means adapted to be attached to said headwear means in a fixed position with respect to a vertical plane to maintain an open-circuit position therein, whereby when said headwear means is tilted by the driver's head said open-circuit position-sensitive switch means closes, causing the energization of said alarm means therein.

* * * * *